United States Patent [19]

Egan

[11] 4,097,364
[45] Jun. 27, 1978

[54] HYDROCRACKING IN THE PRESENCE OF WATER AND A LOW HYDROGEN PARTIAL PRESSURE

[75] Inventor: Clark J. Egan, Piedmont, Calif.

[73] Assignee: Chevron Research Company, San Francisco, Calif.

[21] Appl. No.: 669,779

[22] Filed: Mar. 24, 1976

Related U.S. Application Data

[62] Division of Ser. No. 586,673, Jun. 13, 1975.

[51] Int. Cl.² .................. C10G 13/04; B01J 11/40
[52] U.S. Cl. ................................ 208/111; 208/144;
252/455 Z; 260/668 R; 260/676 R
[58] Field of Search ............ 208/144, 108–112; 260/450, 668 R, 676 R, 683.65

[56] References Cited

U.S. PATENT DOCUMENTS

| | | | |
|---|---|---|---|
| 2,569,463 | 10/1951 | Eastman | 260/450 |
| 2,581,560 | 1/1952 | Shankland et al. | 260/450 |
| 2,600,452 | 6/1952 | Voorhies | 260/450 |
| 3,173,853 | 3/1965 | Peralta | 208/89 |
| 3,254,023 | 5/1966 | Miale et al. | 208/120 |
| 3,256,176 | 6/1966 | Mills | 208/89 |
| 3,530,194 | 9/1970 | Quik et al. | 260/672 |
| 3,531,396 | 9/1970 | Messing et al. | 208/111 |
| 3,576,899 | 4/1971 | Ishiguro et al. | 260/676 |
| 3,619,410 | 11/1971 | Gleim | 208/108 |
| 3,676,331 | 7/1972 | Pitchford | 208/112 |
| 3,699,036 | 10/1972 | Hass et al. | 208/111 |
| 3,702,874 | 11/1972 | Estes et al. | 208/112 |
| 3,833,499 | 9/1974 | Egan et al. | 208/111 |
| 3,894,102 | 7/1975 | Chang et al. | 260/668 R |
| 4,012,455 | 3/1977 | Owen et al. | 260/668 R |

FOREIGN PATENT DOCUMENTS

| | | | |
|---|---|---|---|
| 518,758 | 11/1955 | Canada | 260/450 |

*Primary Examiner*—Delbert E. Gantz
*Assistant Examiner*—G. E. Schmitkons
*Attorney, Agent, or Firm*—D. A. Newell; R. H. Davies; J. J. De Young

[57] ABSTRACT

Disclosed is a process for hydrocracking high-boiling hydrocarbons to lower-boiling hydrocarbons under hydrocracking conditions including high concentrations of water and water precursors and a low partial pressure of hydrogen. Also disclosed is a combination process for the production of synthetic hydrocarbons from CO and $H_2$, wherein the CO and $H_2$ are contacted in a reaction zone containing both a Fischer-Tropsch hydrocarbon synthesis catalyst and a hydrocracking catalyst to produce a reaction product essentially free of oxygenated components. The synthetic hydrocarbons produced by the process of this invention are particularly useful as transportation fuels.

5 Claims, No Drawings

HYDROCRACKING IN THE PRESENCE OF WATER AND A LOW HYDROGEN PARTIAL PRESSURE

CROSS-REFERENCE TO RELATED APPLICATIONS

This application is a division of my copending application Ser. No. 586,673, filed on June 13, 1975.

BACKGROUND OF THE INVENTION

1. Field of the Invention

The invention relates to the catalytic hydrocracking of high-boiling hydrocarbons to produce therefrom lower-boiling hydrocarbons, boiling, for example, in the gasoline, naphtha or diesel range. Furthermore, the invention relates to the catalytic hydrocracking of synthetic hydrocarbons produced in a Fischer-Tropsch process. Still more particularly, the invention relates to the catalytic hydrocracking of substantially the entire reaction product from a Fischer-Tropsch process under catalytic hydrocracking conditions, including a low partial pressure of hydrogen and a high concentration of water and water precursors.

Furthermore, the present invention relates to conversion of oxygenated components produced in the Fischer-Tropsch reaction to hydrocarbons, thus increasing the yield of the hydrocarbons.

The term "hydrocarbons" is used in the present application to mean molecules containing only carbon and hydrogen.

The term "oxygenated components" or "oxygenated compounds" is used herein to mean molecules containing carbon, hydrogen and oxygen. As used herein, the term, "oxygenated components" does not include water, carbon monoxide or carbon dioxide.

The term "water precursors" as used herein includes carbon monoxide and carbon dioxide and any oxygen-containing compounds from which water may be formed during the hydrocracking reaction. Examples of oxygen-containing compounds from which water is formed during the hydrocracking reaction are alcohols, acids, ketones, aldehydes, esters, and the like.

The term "synthetic hydrocarbons" as used herein means hydrocarbons formed in a Fischer-Tropsch process.

The term "hydrocarbon synthesis catalyst" as used herein means those metals or compounds which catalyze or promote the reaction of $H_2$ and CO to form hydrocarbons. These hydrocarbon synthesis catalysts are commonly known as Fischer-Tropsch catalysts.

The present invention also relates to the reduction of waste-water treatment and corrosion problems normally associated with the by-product waste water formed in the Fischer-Tropsch process.

2. Description of the Prior Art

The catalytic hydrocracking of high-boiling hydrocarbons to produce lower-boiling hydrocarbons is well known in the art. Typically the high-boiling hydrocarbons are contacted with a Group VI and/or VIII metal deposited on an acidic support at an elevated temperature and pressure. Hydrocracking reaction conditions include elevated temperatures, from 400°-800° F, and pressures from 500-3000 psig, with typical commercial operating conditions including temperatures from 500°-750° F and pressures from 800-2400 psig. Hydrogen partial pressure is an important parameter in most hydrocracking processes. Typical hydrogen partial pressures which are used in commercial facilities generally range from 700 to 2100 psi. The use of high pressures require expensive equipment and utility costs for compression are also much higher.

Many hydrocracking catalysts are extremely sensitive to impurities in the feed stream, such as nitrogen, sulfur, CO, $CO_2$, oxygenated components, water and water precursors.

U.S. Pat. No. 3,095,367 issued to Klein et al. relates to the catalytic conversion of gasoline-boiling-range hydrocarbons, and particularly to the removal of water and oxygen from hydroconversion feedstocks prior to hydrocracking. This patent discloses that oxygen-containing fragments have an adverse effect on certain catalytic conversions, and particularly can cause rapid catalyst deactivation, particularly when the hydrogen partial pressure is below 150 psi. Kline et al. teach the stripping of these oxygen contaminants from the hydrocarbon fraction with a stream of dry hydrogen prior to catalytic conversion of the hydrocarbon fraction.

U.S. Pat. No. 3,173,853, issued to Peralta, relates to the catalytic hydrocracking of substantially organic nitrogen-free, high-boiling hydrocarbons to produce lower-boiling hydrocarbons. Peralta teaches that a small amount (up to about 2 weight percent, preferably 0.005-1.5 weight percent) water and water precursors such as CO, $CO_2$, alcohols, ketones, aldehydes and esters can be used as promoters for catalytic hydrocracking. Larger amounts of water are taught as being undesirable in that the catalytic activity of the hydrocracking catalyst is impaired. It is also said in Peralta that the process can be carried out at pressures of 500-3000 psig with hydrogen to oil ratios between 5,000 and 15,000 scf per barrel of feed, which corresponds to hydrogen partial pressures of 460 to 2911 psi; however, the lowest hydrogen partial pressure used in accordance with the examples is 1405 psig.

U.S. Pat. 3,699,036, issued to Hass et al., relates to a process for hydrocracking feedstocks containing substantial amounts of organonitrogen compounds. Hass et al. teach that the addition of water or water precursors to the reaction mixture inhibits the normally deleterious effect of organonitrogen compounds on the hydrocracking catalyst activity.

The reaction of CO and $H_2$ to form hydrocarbons, water, alcohols, acids, and other products, has long been known in the art and was extensively investigated in the 1930's and 40's. The book "The Fischer-Tropsch and Related Synthesis" by Storch et al. details the well-known Fischer-Tropsch catalyst and process conditions. The Fischer-Tropsch synthesis was used extensively in Germany to produce gasoline-boiling-range hydrocarbons during World War II. Today the Fischer-Tropsch synthesis is still being used commercially in South Africa to produce straight-chain, high-boiling-range hydrocarbons with some medium-boiling oils, diesel oil, LP gas and oxygenated compounds. Normally substantial quantities of oxygenated compounds appear in the Fischer-Tropsch reaction product. These oxygenated components are typically separated from the hydrocarbons, purified, and used as feedstocks for other processes. Typically the reaction product of the Fischer-Tropsch process is cooled down, and non-condensable gases are separated from the condensed liquids. The condensed liquid products normally separate into two phases, one phase containing primarily the synthetic hydrocarbons, with the second phase comprising water and most of the oxygenated components.

The hydrocarbon phase will also contain small amounts of the higher molecular weight oxygenated components which are not soluble in the water phase. However, most of the oxygenated components formed in the Fischer-Tropsch process are of relatively low molecular weight and will appear in the water phase.

The condensed water phase contains sufficient quantities of acids, particularly acetic acid, such that special corrosion-resistant condensers and separators must be used. Also due to the presence of acetic acid and the other oxygenated components in the water phase, this waste water cannot be disposed in many municipal sewage systems, and must undergo substantial treatment prior to disposal.

The hydrocarbons produced in the Fischer-Tropsch process are not particularly suitable, per se, as transportation fuels because of their high normal olefin and normal paraffin content. Normal olefins and paraffins have much lower octane values as compared to the branched-chain paraffins.

Thus, in addition to the above-described problems with prior art processes, the hydrocarbons obtained from Fischer-Tropsch processes must undergo further processing to increase their value as transportation fuels.

U.S. Pat. No. 3,122,493 relates to a process for the recovery of petroleum and mineral aggregates in which a Fischer-Tropsch step is utilized. This patent teaches that the Fischer-Tropsch product is passed through a condenser and the condensed liquid undergoes a phase separation with the hydrocarbons in one liquid phase and the water, alcohols, organic acids and aldehydes in a second phase. The water is separated from the oxygenated components by distillation with the recovered oxygenated components being sold or recycled for reconversion to hydrocarbons. The hydrocarbon phase is passed to a cracking unit for further processing.

In U.S. Pat. No. 2,634,286, Storch et al. disclose a process in which coal is gasified and the Fischer-Tropsch synthesis is utilized to convert CO and $H_2$ to produce a mixture of hydrocarbons and oxygenated organic compounds. The reaction product is condensed and separated into a gas, oil, and an aqueous fraction containing the oxygenated components.

The existing commercial facilities using the Fischer-Tropsch process are detailed in a series of four articles by J. C. Hoogendoorn and J. M. Solomon, "Sasol: World's Largest Oil-From-Coal Plant," British Chemical Engineering, Part 1, May 1957, page 238; Part 2, June 1957, page 308; Part 3, July 1957, page 368; Part 4, August 1957, page 418.

The June article discloses the separation of the acids formed in the Fischer-Tropsch synthesis and the need for treating metal surfaces to prevent and inhibit corrosion from these acids.

The July article discloses various methods for processing of the Fischer-Tropsch reaction products. Among the processes disclosed is the hydrogenation of the residual olefins and oxygen components in a prior separated hydrocarbon fraction boiling in the range 370°–460° C.

The August article discloses various chemical recovery methods for separating the oxygenated by-products of the Fischer-Tropsch reaction. Hydrogenation of the separated components is discussed, along with a method for converting the aldehydes and ketones to alcohols.

T. Q. Eliot et al., *Chemical Engineering Progress, Vol. 45, No. 8*, p 532 (1949) discuss many of the problems encountered with the oxygenated components formed in the Fischer-Tropsch reaction. More particularly, this article discusses the corrosion, separation, and chemical instability problems in processing Fischer-Tropsch reaction products.

SUMMARY OF THE INVENTION

A process for hydrocracking high-boiling hydrocarbons to lower-boiling hydrocarbons in the presence of water and water precursors which comprises contacting in a reaction zone a feedstock containing said high-boiling hydrocarbons with a hydrocracking catalyst under hydrocracking conditions including a partial pressure of hydrogen from 50 to 450 psig and wherein the concentration of said water and water precursors in said feedstock is greater than 6 percent by weight, based on said feedstock.

DETAILED DESCRIPTION OF THE INVENTION

Briefly, one novel aspect of the present invention resides in carrying out a hydrocracking reaction under unusual hydrocracking conditions, particularly a low partial pressure of hydrogen and a high concentration of water and water precursors. Hydrocracking under these conditions is surprising in view of the prior art teachings on catalyst activity concerning the adverse effects of low hydrogen partial pressures and high concentrations of water and water precursors.

A second novel aspect of the invention resides in the production of high yields of synthetic hydrocarbons for transportation fuels from CO and $H_2$. The synthetic hydrocarbons produced are particularly useful as transportation fuels. Starting with $H_2$ and CO and utilizing the Fischer-Tropsch reaction combined with the hydrocracking reaction as disclosed herein:

(1) increases the yield of synthetic hydrocarbons produced by conversion of the oxygenated components produced by the Fischer-Tropsch catalyst to hydrocarbons;

(2) increases the yield of hydrocarbons useful as transportation fuels by cracking the higher molecular weight hydrocarbons to lower molecular weight hydrocarbons boiling in the range of about 80° to 700° F;

(3) increases the motor fuel value of the hydrocarbons by converting a substantial portion of the straight-chain olefins and paraffins present in the Fischer-Tropsch reaction product to much higher octane-value isoparaffins.

Hydrocracking Feedstocks

Hydrocracking feedstocks which can be employed in the present invention include, in general, hydrocarbon fractions boiling at least partly above the boiling range of the desired product. Generally, the high-boiling hydrocracking feedstocks useful in the present invention will boil in the range 400° to 1000° F. or higher. The hydrocarbons will generally comprise a mixture of paraffins and olefins but may also contain other types of hydrocarbons such as aromatics and cycloparaffinic hydrocarbons. To prevent catalyst fouling the hydrocracking feedstock should be essentially free of sulfur compounds, i.e., less than 5 ppm and preferably less than 0.1 ppm. Also, it is preferred that the hydrocracker feed is essentially free of nitrogen and/or organonitrogen compounds, that is, less than 10 ppm and preferably less than 1 ppm.

It is a surprising finding in the present invention that the hydrocracking reaction proceeds without rapid catalyst fouling under hydrocracking conditions including a feedstock containing a high concentration of water and water precursors. Water and water precursor concentrations in the feedstock will generally be above 55 weight percent and more particularly between about 65 to 90 weight percent, based on the total feedstock.

A particularly preferred feedstock for the present invention is the total reaction product effluent from a Fischer-Tropsch process including the unreacted $H_2$ and CO. The feedstock obtained from the Fischer-Tropsch process may include hydrocarbons having 1 to 60 or more carbon atoms per molecule, as well as oxygenated components, including acids such as acetic acid, alcohols, aldehydes, ketones, and esters. The total Fischer-Tropsch reaction product effluent will also contain appreciable concentrations of water, carbon monoxide, and carbon dioxide. Generally, the water and water precursors in the feedstock obtained from a Fischer-Tropsch process will comprise from 60 to 90 weight percent of the feed to the hydrocracking step. The Fischer-Tropsch reaction product is also particularly preferred feedstock since it is essentially free of aromatic compounds and essentially free of sulfur and nitrogen compounds.

More particularly, the hydrocracking feedstock will contain more than 6 percent water and water precursors and still more particularly from 4 to 15 weight percent water, and from 1 to 20 weight percent oxygenated components. When the Fischer-Tropsch reaction product is used as a feedstock, then in addition to containing 4 to 15 weight percent water and 1 to 20 weight percent oxygenated components, the feedstock will also contain from 40 to 80 weight percent $CO_2$, 1 to 25 weight percent CO, and from 2 to 30 weight percent $H_2$. Additional $H_2$ may, of course, be added to the hydrocracking reaction zone to adjust the $H_2$ partial pressure.

Desired Hydrocarbon Products

One object of the present invention is to maximize the production of liquid hydrocarbons usable as transportation fuels. It is preferred in the present invention to maximize the production of normally liquid hydrocarbons which are usable as transportation fuels, for example gasoline-boiling-range hydrocarbons, typically boiling between 80° and 400° F; jet fuel, typically boiling between 300° and 550° F; and diesel fuels, typically boiling between 340° and 700° F.

The Fischer-Tropsch process, per se, is deficient in many aspects for the production of high yield of hydrocarbons useful as transportation fuels. More particularly:

(1) the Fischer-Tropsch process produces appreciable quantities of high boiling hydrocarbons, that is, boiling above 600° F;

(2) the Fischer-Tropsch process produces appreciable amounts typically from 1 to 20 weight percent, of oxygenated components which are not useful as transportation fuels;

(3) the Fischer-Tropsch process produces appreciable amounts of normal olefins and paraffins which do not have high octane values as compared to the isoparaffins.

Thus, when using the Fischer-Tropsch reaction product as a feedstock, it is desired to produce a hydrocarbon product mixture which (1) boils in the range useful for transportation fuels between about 80° and 700° F, (2) is essentially free of oxygenated components, and (3) contains increased amounts of high octane value isoparaffins. Furthermore, since the feedstock to the Fischer-Tropsch process must be essentially free of sulfur in order to prevent poisoning of the Fischer-Tropsch catalyst, the hydrocarbons obtained from the present invention are also free of sulfur contaminants. This added advantage is particularly important because of the increasing demand for sulfur-free fuels due to more stringent air pollution standards.

Hydrocracking Catalyst

A suitable catalyst for use in the hydrocracking reaction comprises a hydrogenation component and a cracking component. Preferably the hydrogenation component is supported on a refractory cracking base. Suitable cracking bases include, for example, two or more refractory oxides such as a silica-alumina, silica-magnesia, silica-zirconia, alumina-boria, silica-titania, silica-zirconia-titania, acid-treated clays, and the like. Acidic metal phosphates such as alumina-phosphate may also be used. Preferred cracking bases comprise composites of silica and alumina. Additionally, and particularly preferred in the present invention, are the partially dehydrated zeolitic crystalline molecular sieves of the X or Y crystal type, having relatively uniform pore diameters of about 8–14 Angstroms and comprising silica, alumina, and one or more exchangeable zeolitic cations alone or in intimate mixture with other amorphous bases. Particularly preferred are cracking supports containing from 20 to 100 weight percent zeolite.

The hydrogenation components are present upon the cracking base in an amount from 0.3 to 25%. Suitable hydrogenation components are selected from Group VI-B metals, Group VIII metals, their oxides, or mixtures thereof. Useful hydrogenation components comprise the oxides of chromium, tungsten, cobalt, nickel, or the corresponding free metals, or any combination thereof. Particularly useful are the metals platinum, palladium, rhodium or iridium. The oxides of other transition metals, such as rhenium, can be used.

Hydrocracking Conditions

Hydrocracking reaction conditions include temperatures in the range 400° to 800° F., preferably 450° to 750° F., total pressures between 100 to 1000 psig, preferably between 200 to 600 psig, partial pressures of hydrogen between 50 to 450 psi, and preferably 150 to 360 psi, and gas hourly space velocities (GHSV's) between 200 to 2000 and preferably between 500 to 1500. Much higher total pressures and higher hydrogen partial pressure can be utilized, but is is one advantage of the present invention that such low pressures can be used. The use of low pressures is particularly preferred since it results in large saving in construction and operating costs.

When the product from a Fischer-Tropsch process is utilized as the hydrocracking feedstock, it is preferred to utilize hydrocracking conditions which will convert 75 to 99, and preferably 90 to 99.9 percent of the oxygenated components to hydrocarbons, so that the normally liquid hydrocarbon product will contain less than 1.0 and preferably less than 0.5 weight percent oxygenated components. Preferred hydrocracking conditions when utilizing the Fischer-Tropsch reaction product as the hydrocracker feed include a temperature in the range 450 to 750° F., a total pressure in the range 200 to 600 psig, a hydrogen partial pressure between 100 to 500 psi, and a GHSV between 200 to 2000. Conversion of the oxygenated components present in the Fischer-Tropsch reaction product typically results in a 1 to 10 or more weight percent increase in yield of hydrocarbons. The hydrocarbons formed from the oxygenated components will in general contain the same number of carbon atoms as the oxygenated components from which they are formed. The increase in yield of hydrocarbons will, of course, depend upon the quantity of oxygenated components present in the hydrocracking feedstock. Also, the conversion of the oxygenated components, particularly acetic acid, to hydrocarbons substantially reduces the waste-water treatment burdens as compared to treatment of the waste water from a Fischer-Tropsch process.

Product Separation

The effluent from the hydrocracking reaction zone will comprise primarily hydrocarbons, water, $CO_2$, unreacted $H_2$ and CO, and small residual amounts of oxygenated components. The various components can be separated by conventional means, for example, by distillation, but it is preferred to pass the effluent first through a condenser, separating the effluent into gaseous and liquid fractions. The condensed liquid fraction will phase-separate, with the hydrocarbons comprising one phase and water comprising the second phase. The hydrocarbon phase will contain small amounts of water, which can be removed by conventional means. The product hydrocarbons can be split into their appropriate fractions for use as transportation fuels such as gasoline, jet or diesel. The water phase can be disposed of after removal of residual quantities of contaminants such as acetic acid. The $H_2$ in the gaseous fraction can be recycled to the hydrocracker after removal of at least a portion of CO, $CO_2$ and any of the light uncondensed hydrocarbons such as methane and ethane. Alternatively, when using a Fischer-Tropsch reaction product as a feedstock for the hydrocracker, the $H_2$ and CO can be recycled to the Fischer-Tropsch step after removal of at least a portion of the $CO_2$ and light hydrocarbons. Also, any light hydrocarbons formed in the Fischer-Tropsch or hydrocracking steps can be reformed to produce $H_2$ and CO for recycle to the Fischer-Tropsch step.

PREFERRED EMBODIMENTS

In a preferred embodiment of the present invention $H_2$ and CO from any source, for example from the gasification of coal, coke, peat, are passed over a conventional Fischer-Tropsch catalyst to produce a reaction product mixture containing unreacted $H_2$ and CO, $CO_2$, hydrocarbons varying from $C_1$ to $C_{60}$ or higher, water and oxygenated components including alcohols such as methyl, ethyl and propyl alcohol, acids such as formic, acetic and propionic acid, and other oxygenated components such as aldehydes, ketones and esters. When coal or some other carbonaceous material is gasified, the sulfur must be removed prior to feeding the gas to the Fischer-Tropsch step. Generally, the sulfur content of the feed to the Fischer-Tropsch step must be below about 0.1 ppm to prevent poisoning of the catalyst.

The Fischer-Tropsch reaction product is then passed directly, prior to any condensation, to a second reaction zone containing the hydrocracking catalyst. The hydrocracking catalyst serves two functions: first, it cracks the higher-boiling hydrocarbons with carbon atoms greater than about $C_{22}$ into $C_{22}$ - hydrocarbons; second, it converts the oxygenated components to hydrocarbons, thus increasing the yield of the $C_{22}$ - hydrocarbons. The second feature of the invention of converting the oxygenated hydrocarbon components from a Fischer-Tropsch reaction product to hydrocarbons is more fully discussed in my concurrently filed application Ser. No. 586,683 entitled "Hydrocarbon Synthesis Process," the entire disclosure of which is incorporated herein by reference.

In another preferred embodiment, the hydrocarbon synthesis catalyst and the hydrocracking catalyst are contained in a single reaction zone with the $H_2$ and CO passing first over a layer of the hydrocarbon synthesis catalyst and subsequently over a layer of hydrocracking catalyst. The single reaction zone can also contain a physical mixture of the two catalysts.

Preferably, however, two reaction zones are utilized, with the Fischer-Tropsch catalyst in the first reaction zone and the hydrocracking catalyst in the second reaction zone. Two reaction zones are preferred, so that one can readily maintain optimum operating conditions for each reaction. The Fischer-Tropsch step of this preferred embodiment of the invention can utilize either a fixed catalyst bed or a circulating catalyst bed (Kellogg synthesis).

The Fischer-Tropsch catalysts and reaction conditions are well known in the art. Typical Fischer-Tropsch catalysts useful in the process of the preferred embodiment of the present invention are in general the cobalt, nickel, iron, and ruthenium-containing Fischer-Tropsch catalysts taught in "Fischer-Tropsch and Related Synethesis," by H. H. Storch et al., John Wiley & Sons, New York, N.Y. (1951). Typical Fischer-Tropsch process conditions useful in the present invention include a temperature in the range 400°–800° F, a pressure in the range 15–600 psig and a feed gas having an $H_2$:CO ratio from about 1:1 to 3:1, with a preferred feed ratio of $H_2$:CO of about 2:1, and a feed GHSV from 100 to 1000.

The following examples illustrate various embodiments of the invention.

EXAMPLE 1

A mixture of 35 volume percent CO and 65 volume percent $H_2$ was passed over an iron-copper Fischer-Tropsch catalyst at 450° F, 300 psig, and 440 GHSV. The inlet $H_2$ partial pressure was 190 psi. The Fischer-Tropsch catalyst comprising $75Fe^{+2}:25Fe^{+3}:20Cu:1K_2CO_3$ was prepared according to the instructions at page 251, line 12 of "The Fischer-Tropsch and Related Synthesis" by Storch et al., John Wiley & Sons, New York, N.Y. (1951), the disclosure of which is incorporated herein by reference. No hydrocracking catalyst was in the reactor. The condensable reaction products were collected at 70° F, and −100° F and allowed to phase separated into predominantly hydrocarbon and water phases. The phase collected at −100° F was warmed to 70° F prior to analysis. The predominantly water phases were analyzed for carbon content and the predominantly hydrocarbon phases were analyzed for oxygen content. The results are listed in Table I. If one assumes ethanol is the only oxygenated component, then the combined hydrocarbon phases contained 8.5 weight percent ethanol and the combined water phases contained approximately 13 weight percent oxygenated components.

In a similar run with no hydrocracking catalyst, all products were measured over a 72 hr period. The CO comprised 17.8 weight percent of the collected effluent with $CO_2$ comprising 50.3 weight percent and water comprising 8.5 weight percent.

EXAMPLE 2

A mixture of 35 volume percent CO and 65 volume percent $H_2$ was passed over the Fischer-Tropsch catalyst as described in Example 1 at 468° F, 300 psig, and 420 GHSV. The inlet $H_2$ partial pressure was 190 psig. Instead of collecting the Fischer-Tropsch reaction product as in Example 1, the entire reaction product, including unreacted $H_2$ and CO, was passed over a hydrocracking catalyst at 650° F, 300 psig, and 650 GHSV based on the inlet feed. The synthesis and hydrocracking catalyst comprised separate layers in the same reactor with the ratio of synthesis catalyst to hydrocracking catalyst being 1.5. The hydrocracking catalyst used in this example comprised palladium on an amorphous inorganic oxide and zeolite. More particularly, the hydrocracking catalyst was prepared in accordance with the instructions in U.S. Pat. No. 3,833,499 and corresponds in composition with that of the catalyst D in U.S. Pat. No. 3,833,499, the disclosure of which is incorporated herein by reference. The hydrocracking catalyst was prereduced in hydrogen at 600° F, 300 psig for five hours prior to use. The synthesis catalyst had been in use for 2200 hours, and the hydrocracking catalyst had been in use for 1500 hours. The condensable reaction products were collected at 70° F, and −100° F and allowed to phase separate into predominantly hydrocarbon and water phases. The phase collected at −100° F was warmed to 70° F prior to analysis. The predominantly water phases were analyzed for carbon content and titratable acids. The predominantly hydrocarbon phases were analyzed for oxygen content. The results are listed in Table I below.

TABLE I

| | Ex. 1 | Ex. 2 |
|---|---|---|
| Hydrocarbon phase collected at 70° F | | |
| oxygen content, wt% | 2.64 | 0.07 |
| oxygen in feed converted to oxygen in hydrocarbon phase, wt% | 0.29 | 0.004 |
| Hydrocarbon phase collected at −100° F | | |
| oxygen content, wt% | 5.82 | 0.17 |
| oxygen in feed converted to oxygen in hydrocarbon phase, wt% | 0.53 | 0.019 |
| Oxygen in feed converted to oxygen in both hydrocarbon phases, wt% | 0.82 | 0.023 |
| Water phase collected at 70° F | | |
| carbon, wt% | 2.93 | 0.28 |
| carbon in feed converted to carbon in water phase, wt% | 0.32 | 0.034 |
| acidity, meq/g | 0.854 | 0.072 |
| carbon in feed converted to carbon in water phase calculated as acetic acid, wt% | 0.223 | 0.021 |
| Water phase collected at −100° F | | |
| carbon, wt% | 10.7 | 1.70 |
| carbon in feed converted to carbon in water phase, wt% | 1.04 | 0.142 |
| acidity, meq/g | 0.209 | 0.034 |
| carbon in feed converted to carbon in water phase calculated as acetic acid, wt% | 0.020 | 0.007 |
| Carbon in feed converted to carbon in both water phases, wt% | 1.36 | 0.18 |
| Carbon in feed converted to carbon in both water phases, calculated as acetic acid, wt% | 0.24 | 0.028 |

Comparison of Example 1 with Example 2 shows:

(1) An 87% reduction in the conversion of carbon in the feed to carbon in the water phases.

(2) A 97% reduction in the conversion of oxygen in the feed to oxygen in the hydrocarbon phases.

(3) Approximately a 10 fold decrease in the acidity of the water phases.

(4) Approximately a 6 weight percent increase in the total hydrocarbon product assuming a 50% conversion of CO to paraffins and assuming ethanol is the only oxygenated component formed.

EXAMPLE 3

A mixture of 50 volume percent CO and 50 volume percent $H_2$ was passed over an iron-copper Fischer-Tropsch catalyst at 470° F, 450 psig, and 330 GHSV. The inlet $H_2$ partial pressure was 218 psi. The Fischer-Tropsch catalyst comprising $75Fe^{+2}:25Fe^{+3}:20Cu:1K_2CO_3$ was prepared as in Example 1. The condensable reaction products were collected at room temperature and allowed to phase separate into predominantly hydrocarbon and water phases. The predominantly hydrocarbon phase had a boiling range of 330°–1025° F and contained 2.2 weight percent oxygen.

EXAMPLE 4

A mixture of 50 volume percent CO and 50 volume percent $H_2$ was passed over the Fischer-Tropsch catalyst as described in Example 1 at 470° F, 450 psig, and 285 GHSV. However, instead of collecting the Fischer-Tropsch reaction product as in Example 3, the entire reaction product, including unreacted $H_2$ and CO, was passed over a hydrocracking catalyst at 580° F, 450 psig, and at 430 GHSV. The synthesis and hydrocracking catalyst comprised separate layers in the same reactor with the ratio of synthesis catalyst to hydrocracking catalyst being 1.5. The hydrocracking catalyst used in this example had the same composition and was prepared in the same manner as in Example 2.

The condensable portion of the reaction product was collected at room temperature and allowed to phase separate into a predominantly hydrocarbon and water phase. The predominantly hydrocarbon phase had a boiling range of 100° to 540° F and contained less than 0.2 weight percent oxygen.

Comparison of Examples 3 and 4 indicates:

(1) that the yield of hydrocarbons useful as transportation fuels was increased by the lowering of the end point of the product from 1025° F to about 540° F;

(2) that the yield of hydrocarbons was increased by conversion of more than 90% of the oxygenated compounds present in the hydrocarbon phase to hydrocarbons.

EXAMPLE 5

A mixture of 35 volume percent CO and 65 volume percent $H_2$ was passed over a physical mixture of a hydrocarbon synthesis catalyst and hydrocracking catalyst. The physical mixture of the two catalysts comprised 1 volume of the iron-copper catalyst described in Example 1 and 0.55 volume of hydrocracking catalyst described in Example 2. Below this physical mixture of two catalysts was an additional 0.11 volume of the hydrocracking catalyst. The run conditions were 500° F and 300 psig with an inlet hydrogen partial pressure of 190 psi. The condensable portion of the reaction product was collected at room temperature and allowed to phase separate. The predominantly hydrocarbon liquid phase was essentially free of oxygenated components and contained 32 weight percent isoparaffin. A simulated true boiling point distillation indicated a 10% point of 280° F, a 50% point of 418° F, and a 90% point of 542° F. The freezing point was −45° F and ASTM smoke point was above 30 mm.

The above example illustrates:

(1) that a physical mixture of the two catalysts can be utilized;

(2) that the liquid hydrocarbon product is particularly suitable as a jet fuel with its high isoparaffin content, low freezing point and high smoke point.

EXAMPLE 6

A mixture of 34 volume percent CO and 66 volume percent $H_2$ was passed over the iron-copper hydrocarbon synthesis catalyst described in Example 1 at 450° F, 450 psig and 425 GHSV; and then, in the same reactor, over the hydrocracking catalyst described in Example 2 at 550° F, 450 psig and 640 GHSV. The inlet $H_2$ partial pressure was 292 psi.

After 600 hours of operation, the temperature of the synthesis catalyst was 450° F; the temperature of the hydrocracking catalyst was 550° F; the conversion of CO to paraffins was 54%; the conversion of CO to $CO_2$ was 37%; and the conversion of CO to titratable acids in the water layer was 0.04 weight percent calculated as acetic acid. The temperature of each catalyst was slowly increased to maintain conversion. After 2100 hours of operation, the temperature of the synthesis catalyst was 468° F; the temperature of the hydrocracking catalyst was 650° F; the conversion of CO to paraffins was 54%; the conversion of CO to $CO_2$ was 38%; and the conversion of CO to titratable acids in the water layer was less than 0.04 weight percent calculated as acetic acid. The boiling range of the hydrocarbon layer was below 650° F. The hydrocracking catalyst was the same as in Example 2.

The above example illustrates the stability and low fouling rate of the hydrocracking catalyst in the process of the present invention. The acid content of the water layer is the present example is only 0.1 that of the acid content of the water layer when no hydrocracking catalyst is present. This illustrates the significant reduction in waste water treatment necessary prior to disposal of the water layer.

The present invention is not intended to be limited to the foregoing embodiments, as good results are also obtainable using other catalysts of the class disclosed herein and other operating conditions.

What is claimed is:

1. A process for hydrocracking high-boiling hydrocarbons boiling in the range from 400° to 1000° F to form lower-boiling hydrocarbons boiling in the range from 80° to 700° F, which comprises contacting said high-boiling hydrocarbons, in a reaction zone, in a feedstock containing from 4 to 15 weight percent water and containing straight-chain olefins and oxygen-containing water precursors including CO and $CO_2$ and from about 1 to 20 weight percent of oxygen-containing organic compounds, based on said feedstock, said feedstock containing less than 5 ppm sulfur, by weight, and greater than 55 weight percent of water and oxygen-containing water precursors, with a hydrocracking catalyst including a Group VIB or Group VIII metal supported on a refractory cracking base at hydrocracking conditions including a partial pressure of hydrogen of from 50 to 450 psi and a temperature of from 450° to 750° F, to convert 75 to 99 percent of said oxygen-containing organic compounds to hydrocarbons, to convert said high-boiling hydrocarbons to said lower-boiling hydrocarbons, and to convert a substantial portion of said straight-chain olefins to isoparaffins and paraffins.

2. The process of claim 1 wherein said feedstock is essentially free of organonitrogen compounds.

3. The process of claim 1 wherein said catalyst comprises palladium deposited on a cracking support containing zeolite.

4. The process of claim 1 wherein the partial pressure of hydrogen is from 150 to 360 psi.

5. The process of claim 1 wherein said hydrocracking conditions include a total pressure in the range 200 to 600 psi, a hydrogen partial pressure in the range 150 to 360 psi, a gas hourly space velocity in the range 500 to 1500 and a hydrocracking catalyst comprising palladium deposited on a cracking support containing zeolite.

* * * * *